US012347632B2

(12) United States Patent
Wang et al.

(10) Patent No.: US 12,347,632 B2
(45) Date of Patent: Jul. 1, 2025

(54) KEY DEVICE

(71) Applicants: Maintek Computer (Suzhou) Co., Ltd., JiangSu (CN); PEGATRON CORPORATION, Taipei (TW)

(72) Inventors: Jing-Bo Wang, JiangSu (CN); Chun-Yen Huang, JiangSu (CN); Yan-Bo An, JiangSu (CN)

(73) Assignees: Maintek Computer (Suzhou) Co., Ltd., JiangSu (CN); PEGATRON CORPORATION, Taipei (TW)

( * ) Notice: Subject to any disclaimer, the term of this patent is extended or adjusted under 35 U.S.C. 154(b) by 137 days.

(21) Appl. No.: 18/168,834

(22) Filed: Feb. 14, 2023

(65) Prior Publication Data

US 2023/0268145 A1 Aug. 24, 2023

(30) Foreign Application Priority Data

Feb. 22, 2022 (CN) ......................... 202220360566.5

(51) Int. Cl.
*H01H 15/10* (2006.01)

(52) U.S. Cl.
CPC ....... *H01H 15/10* (2013.01); *H01H 2223/003* (2013.01); *H01H 2227/004* (2013.01)

(58) Field of Classification Search
CPC ............. H01H 15/10; H01H 2223/003; H01H 2227/004; H01H 9/04; H01H 15/02; H01H 15/102; H01H 15/107; H01H 15/16; G06F 3/0202
See application file for complete search history.

(56) References Cited

U.S. PATENT DOCUMENTS

| | | | | |
|---|---|---|---|---|
| 3,723,692 A * | 3/1973 | Wilbrecht | .............. | H01H 15/06 200/302.1 |
| 4,628,166 A * | 12/1986 | Bingo | .................. | H01H 15/005 200/16 D |
| 2017/0169968 A1* | 6/2017 | Cai | ........................ | H01H 15/10 |

FOREIGN PATENT DOCUMENTS

| | | |
|---|---|---|
| CN | 104091710 | 6/2016 |
| CN | 111180239 | 5/2020 |
| JP | 2005183159 | 7/2005 |
| KR | 20170045090 | 4/2017 |
| KR | 20210132361 | 11/2021 |

* cited by examiner

*Primary Examiner* — Lheiren Mae A Caroc
(74) *Attorney, Agent, or Firm* — J.C. PATENTS

(57) ABSTRACT

A key device including a casing, a soft material layer, a key, and an elastic support member is provided. The casing has a first assembly hole. The soft material layer is disposed on the casing and has a second assembly hole. The key presses the soft material layer and is disposed on the casing. The key has a key body, and the key body passes through the second assembly hole and the first assembly hole correspondingly and is exposed to the outside of the casing. The elastic support member is assembled on the key and disposed on the casing, and the elastic support member has a sliding groove. The sliding groove corresponds to the key so that the key is slidably disposed in the sliding groove. The key device has slidable, waterproof, and dustproof functions.

8 Claims, 2 Drawing Sheets

KEY DEVICE

CROSS-REFERENCE TO RELATED APPLICATION

This application claims the priority benefit of China application serial no. 202220360566.5, filed on Feb. 22, 2022. The entirety of the above-mentioned patent application is hereby incorporated by reference herein and made a part of this specification.

BACKGROUND

Technical Field

The disclosure relates to a key device, in particular to a key device having slidable, waterproof, and dustproof functions.

Description of Related Art

Nowadays, the sliding key of the electronic device is not designed with waterproof and dustproof functions, so the internal component of the electronic device is easily disconnected or short-circuited due to moisture or dust and may not be used normally. In order to solve the above problems, the sliding key is currently designed as a waterproof module, which is combined with the casing using the waterproof rubber and is connected with the main board using the cable inside. However, the design of the waterproof sliding key has a higher cost and needs more assembly materials, and the cable must be used to be connected with the main board, thereby increasing the production cost.

SUMMARY

The disclosure provides a key device, which has slidable, waterproof, and dustproof functions.

A key device of the disclosure includes a casing, a soft material layer, a key, and an elastic support member. The casing has a first assembly hole. The soft material layer is disposed on the casing and has a second assembly hole. The key presses the soft material layer and is disposed on the casing. The key has a key body, and the key body passes through the second assembly hole and the first assembly hole correspondingly and is exposed to the outside of the casing. The elastic support member is assembled on the key and disposed on the casing, and the elastic support member has a sliding groove. The sliding groove corresponds to the key so that the key is slidably disposed in the sliding groove.

In an embodiment of the disclosure, the above-mentioned key device may further include a wear-resistant material layer disposed on the casing and located between the elastic support member and the soft material layer. The wear-resistant material layer may have a third assembly hole, and the key body may pass through the third assembly hole, the second assembly hole, and the first assembly hole correspondingly and may be exposed to the outside of the casing.

In an embodiment of the disclosure, the shape and the size of the first assembly hole, the shape and the size of the second assembly hole, and the shape and the size of the third assembly hole may be all the same.

In an embodiment of the disclosure, the thickness of the above-mentioned wear-resistant material layer and the thickness of the soft material layer may be both smaller than the thickness of the elastic support member.

In an embodiment of the disclosure, the above-mentioned key may further include a sliding main board portion. The sliding main board portion may be connected with the key body, and may be slidably disposed in the sliding groove and press the soft material layer.

In an embodiment of the disclosure, the above-mentioned key body and the sliding main board portion may be a single-piece structure.

In an embodiment of the disclosure, the orthographic projection of the key body on the sliding main board portion may be smaller than and completely overlap the sliding main board portion.

In an embodiment of the disclosure, the orthographic projection area of the sliding groove on the casing may be larger than the orthographic projection area of the sliding main board portion on the casing.

In an embodiment of the disclosure, the sliding direction of the above-mentioned key may be the same as the extending direction of the first assembly hole and the extending direction of the second assembly hole.

Based on the above, the key device of the disclosure includes the soft material layer and the elastic support member. When the key presses the soft material layer and is disposed on the casing, waterproof and dustproof sealing effects may be achieved, and when the elastic support member is assembled on the key and disposed on the casing, the key may slide smoothly in the sliding groove to form the sliding key with the sliding function.

In order to make the above-mentioned features and advantages of the disclosure clearer and easier to understand, the following embodiments are given and described in details with the accompanying drawings as follows.

DESCRIPTION OF THE EMBODIMENTS

Figure 1:
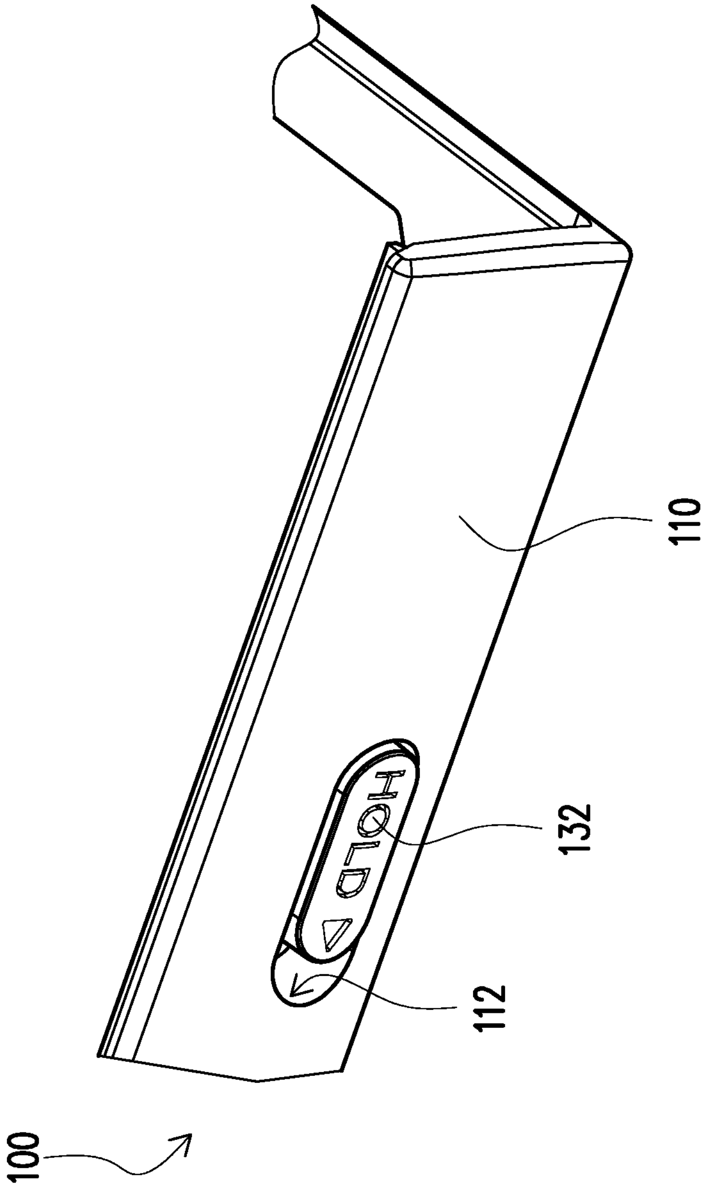
FIG. 1 is a schematic perspective view of a key device according to an embodiment of the disclosure.
Figure 2:
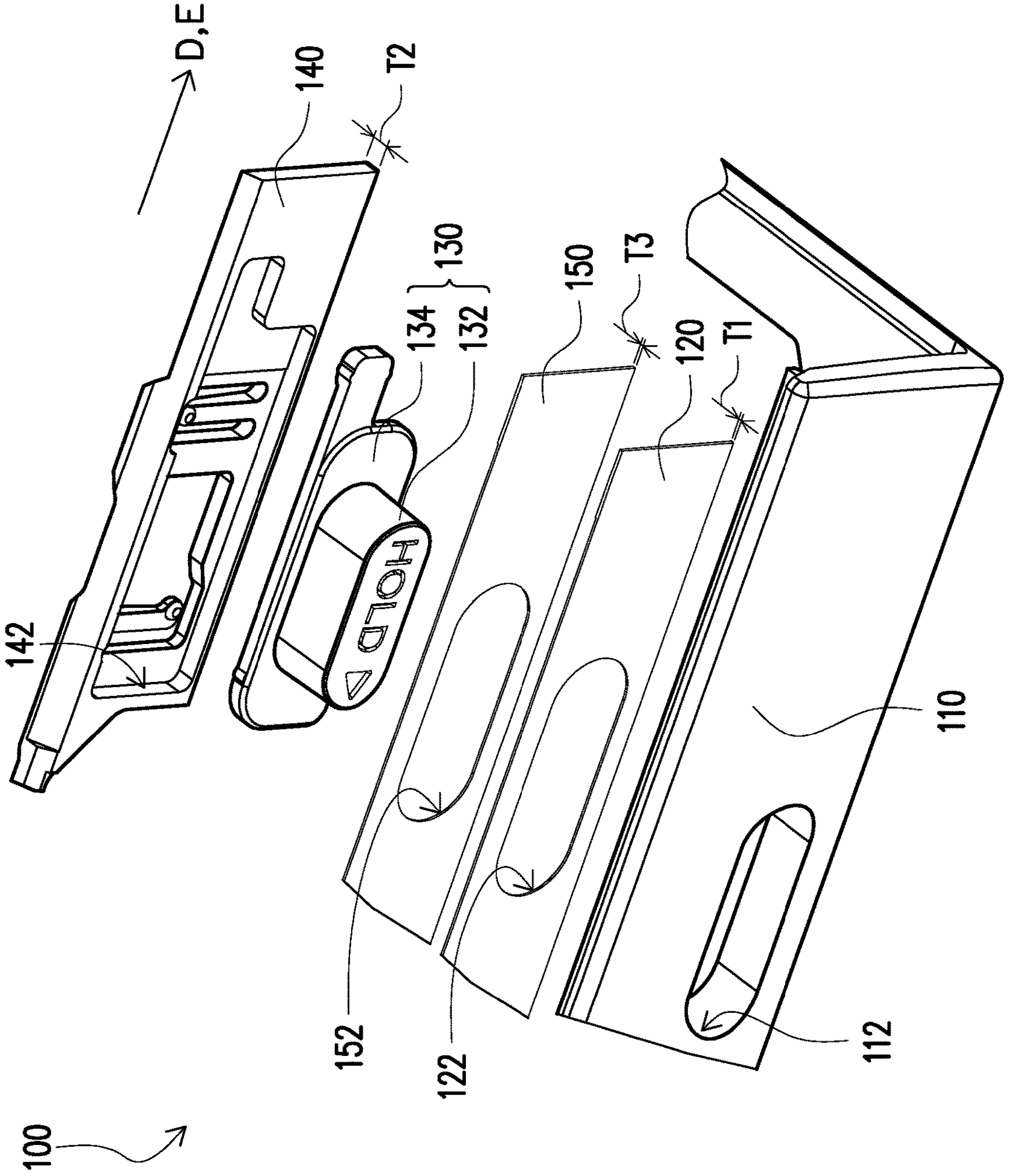
FIG. 2 is a schematic exploded perspective view of the key device of FIG. 1.

FIG. 1 is a schematic perspective view of a key device according to an embodiment of the disclosure. FIG. 2 is a schematic exploded perspective view of the key device of FIG. 1.

Please refer to FIG. 1 and FIG. 2 at the same time. In the embodiment, a key device 100 includes a casing 110, a soft material layer 120, a key 130, and an elastic support member 140. The casing 110 has a first assembly hole 112. The soft material layer 120 is disposed on the casing 110 and has a second assembly hole 122. The key 130 presses the soft material layer 120 and is disposed on the casing 110. The key 130 has a key body 132, and the key body 132 may pass through the second assembly hole 122 and the first assembly hole 112 correspondingly and be exposed to the outside of the casing 110 so as to be touched by the user. The elastic support member 140 is assembled on the key 130, and the elastic support member 140 has a sliding groove 142. The sliding groove 142 corresponds to the key 130 so that the key 130 is slidably disposed in the sliding groove 142.

In detail, the key 130 of the embodiment further includes a sliding main board portion 134. The sliding main board portion 134 is connected with the key body 132, and is slidably disposed in the sliding groove 142 and presses the soft material layer 120. Preferably, the key body 132 and the sliding main board portion 134 are embodied as a single-piece structure, so the cable in the prior art is not required and may effectively reduce the production cost. Here, as shown in FIG. 2, the orthographic projection of the key body 132 on the sliding main board portion 134 is smaller than and completely overlaps the sliding main board portion 134. The orthographic projection area of the sliding groove 142 of the elastic support member 140 on the casing 110 is larger than the orthographic projection area of the sliding main board portion 134 on the casing 110, so that the key 130 may slide smoothly in the sliding groove 142 to form the sliding key such as a lock key (HOLD key), but is not limited hereto. A sliding direction D of the key 130 is substantially the same as an extending direction E of the first assembly hole 112 and an extending direction E of the second assembly hole 122. Here, the shapes of the first assembly hole 112 and the second assembly hole 122 are both oval, and the extending direction E is the long axis direction of the oval, but is not limited hereto.

The key 130 of the embodiment may press the soft material layer 120 and be disposed on the casing 110, thereby achieving waterproof and dustproof sealing effects. Furthermore, the elastic support member 140 is assembled on the key 130 and disposed on the casing 110, so that the key 130 may have the sliding function to form the sliding key. In addition, the key body 132 of the key 130 and the sliding main board portion 134 are embodied as a single-piece structure, so the cable in the prior art is not required and may effectively reduce the production cost. Here, the material of the soft material layer 120 may be a foam, and the material of the elastic support member 140 may be a plastic or a metal, but are not limited hereto.

Furthermore, please refer to FIG. 2 again. The key device 100 of the embodiment may further include a wear-resistant material layer 150 disposed on the casing 110 and located between the elastic support member 140 and the soft material layer 120. The wear-resistant material layer 150 is embodied as a smooth hard wear-resistant material, such as a Mylar, but is not limited hereto, and the wear-resistant material layer 150 has a third assembly hole 152. The key body 132 of the key 130 may pass through the third assembly hole 152 of the wear-resistant material layer 150, the second assembly hole 122 of the soft material layer 120, and the first assembly hole 112 of the casing 110 correspondingly and be exposed to the outside of the casing 110. Here, the key 130 may slide along the sliding groove 142, thus causing friction between the component layers, and the disposition of the wear-resistant material layer 150 may prevent the elastic support member 140 from directly contacting the soft material layer 120, thereby avoiding damage to the soft material layer 120 and affecting the waterproof and dustproof reliability. In other words, the disposition of the wear-resistant material layer 150 may improve the structural reliability of the soft material layer 120.

In addition, as shown in FIG. 2, the shape of the first assembly hole 112, the shape of the second assembly hole 122, and the shape of the third assembly hole 152 of the embodiment are all oval, but are not limited hereto. The size of the first assembly hole 112, the size of the second assembly hole 122, and the size of the third assembly hole 152 are also the same. Preferably, the wear-resistant material layer 150 and the soft material layer 120 may be fixed together by gluing. A thickness T3 of the wear-resistant material layer 150 and a thickness T1 of the soft material layer 120 are both smaller than a thickness T2 of the elastic support member 140.

Additionally, during assembly, the soft material layer 120 and the wear-resistant material layer 150 may be assembled on the casing 110 first. Next, the key 130 is assembled on the casing 110. Finally, the elastic support member 140 is assembled on the casing 110. So far, the assembly of the key device 100 has been completed. The key 130 of the assembled key device 100 presses the soft material layer 120 to achieve waterproof and dustproof sealing effects, and the elastic support member 140 is assembled on the key 130 so that the key 130 may slide smoothly and have the sliding function. In short, the key device 100 of the embodiment not only may achieve slidable, waterproof, and dustproof sealing effects, but also has the advantage of being simple and easy to assembly, thereby reducing assembly man-hours and improving production efficiency.

To sum up, the key device in the embodiment of the disclosure includes the soft material layer and the elastic support member. When the key presses the soft material layer and is disposed on the casing, waterproof and dustproof sealing effects may be achieved, and when the elastic support member is assembled on the key and disposed on the casing, the key may slide smoothly in the sliding groove to form the sliding key with the sliding function. Furthermore, the key body of the key and the sliding main board portion are embodied as a single-piece structure, so the cable in the prior art is not required and may effectively reduce the production cost. In addition, the key device in the embodiment of the disclosure is relatively simple and easy to assemble, thereby reducing assembly man-hours and improving production efficiency.

Finally, it should be noted that the embodiments are only used to illustrate the technical solutions of the disclosure and not to limit them. Although the disclosure has been described in detail with reference to the embodiments above, any person skilled in the art should understand that the technical solutions described in the embodiments above may still be modified, or some or all of the technical features may be equivalently substituted. However, the modifications or substitutions do not make the essence of the corresponding technical solutions deviate from the scope of the technical solutions of the embodiments of the disclosure.

What is claimed is:

1. A key device, comprising:
- a casing having a first assembly hole;
- a soft material layer disposed on the casing and having a second assembly hole;
- a key pressing the soft material layer and disposed on the casing, wherein the key has a key body, and the key body passes through the second assembly hole and the first assembly hole correspondingly and is exposed to an outside of the casing; and
- an elastic support member assembled on the key and disposed on the casing, wherein the elastic support member has a sliding groove, and the sliding groove corresponds to the key so that the key is slidably disposed in the sliding groove,
- wherein the key further comprises a sliding main board portion connected with the key body, wherein the sliding main board portion is slidably disposed in the sliding groove and presses the soft material layer.

2. The key device according to claim 1, further comprising:
- a wear-resistant material layer disposed on the casing and located between the elastic support member and the soft material layer, wherein the wear-resistant material layer has a third assembly hole, and the key body passes through the third assembly hole, the second assembly hole, and the first assembly hole correspondingly and is exposed to the outside of the casing.

3. The key device according to claim 2, wherein a shape and a size of the first assembly hole, a shape and a size of the second assembly hole, and a shape and a size of the third assembly hole are all the same.

4. The key device according to claim 2, wherein a thickness of the wear-resistant material layer and a thickness of the soft material layer are both smaller than a thickness of the elastic support member.

5. The key device according to claim 1, wherein the key body and the sliding main board portion are a single-piece structure.

6. The key device according to claim 1, wherein an orthographic projection of the key body on the sliding main board portion is smaller than and completely overlaps the sliding main board portion.

7. The key device according to claim 1, wherein an orthographic projection area of the sliding groove on the casing is larger than an orthographic projection area of the sliding main board portion on the casing.

8. The key device according to claim 1, wherein a sliding direction of the key is the same as an extending direction of the first assembly hole and an extending direction of the second assembly hole.

* * * * *